(No Model.)
J. D. SCOVEL.
GLASS ROOF FRAME.
No. 460,313. Patented Sept. 29, 1891.
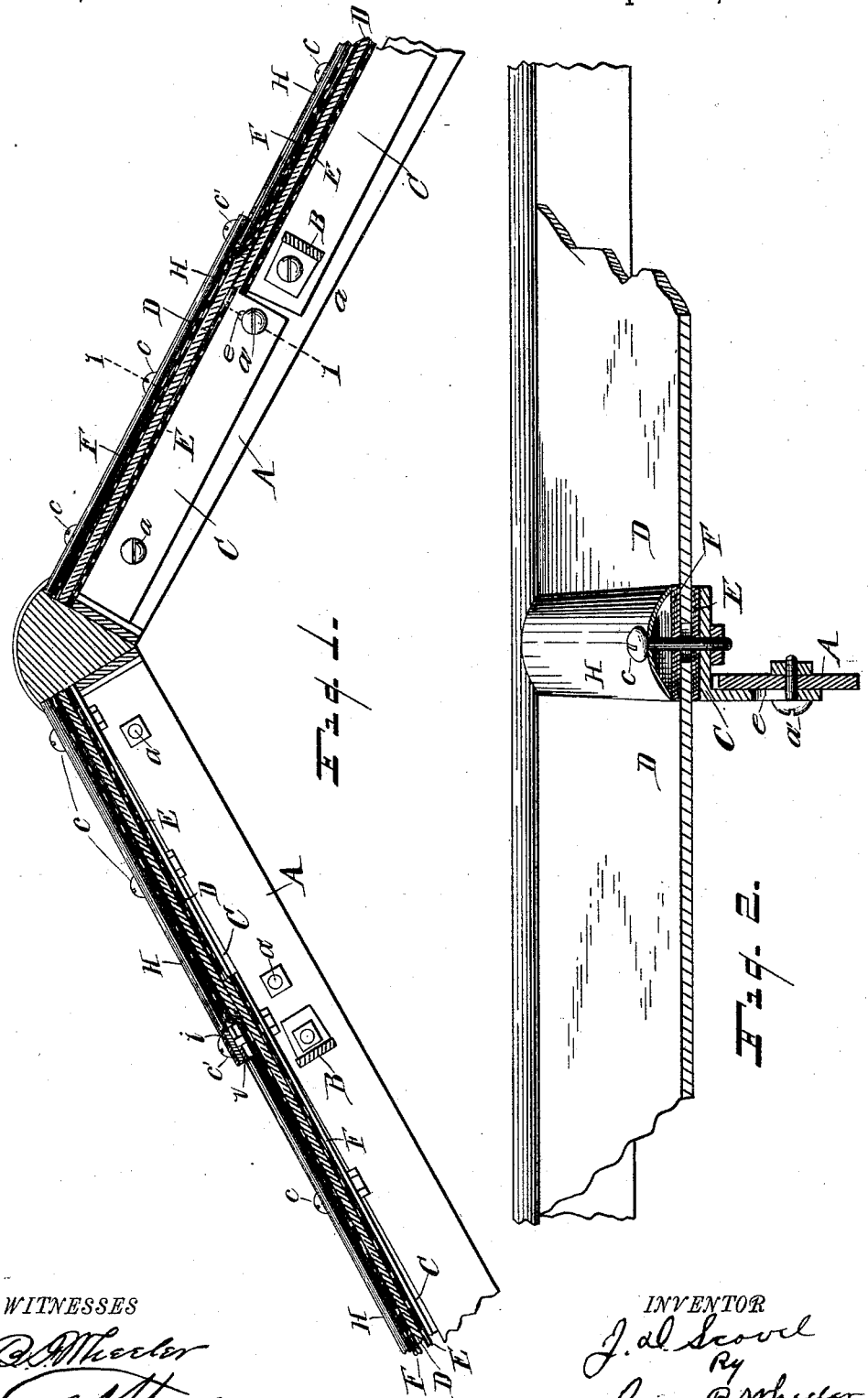
WITNESSES
INVENTOR
J. D. Scovel
By
Roscoe B. Wheeler
Attorney.

UNITED STATES PATENT OFFICE.

JAMES D. SCOVEL, OF DETROIT, MICHIGAN.

GLASS-ROOF FRAME.

SPECIFICATION forming part of Letters Patent No. 460,313, dated September 29, 1891.

Application filed December 6, 1890. Serial No. 373,735. (No model.)

*To all whom it may concern:*

Be it known that I, JAMES D. SCOVEL, a citizen of the United States, residing at Detroit, in the county of Wayne and State of Michigan, have invented certain new and useful Improvements in Glass-Roof Frames; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in glass-roof frames; and it consists in a certain construction and arrangement of parts, as hereinafter fully set forth, the essential features of which are pointed out particularly in the claims.

The object of the invention is to provide a roof-frame of light and simple construction that is possessed of the requisite strength for supporting the glass, and that will enable the glass to be readily and firmly secured thereon, forming a tight roof and one that offers but slight obstruction to the rays of light. This object is attained by the construction illustrated in the accompanying drawings, in which—

Figure 1 is a cross-section through a span-roof embodying my improved features. Fig. 2 is a sectional view on dotted line 1 1 of Fig. 1.

Referring to the letters of reference, A indicates the rafters, which are formed, preferably, of thin steel bars set edgewise, whereby the requisite strength is obtained without presenting a broad surface to obstruct the light. Said rafters extend parallel at such distance apart as to correspond with the width of the panes of glass in the roof, and are coupled by the transverse bars B, (shown in cross-section in Fig. 1,) that prevent the spreading of said rafters and secure them against lateral play.

C indicates a series of elbow-shaped angle plates or saddles mounted on the rafters A, the vertical portion of said plate being secured to the side of the rafter by the screw-bolts $a\ a'$, the upper end being pivoted, as shown at $a$, and the lower end adjustably secured to the rafter, as shown at $a'$. The upper portion of said plate extends horizontally and forms a firm and broad bearing for the edges of the panes of glass D, that rest thereon. The lower end of the vertical portion of each plate C is provided with a slot $e$, through which the bolts $a'$ pass, which enables the lower end of said plate to be raised, to elevate the lower ends of the panes of glass lying thereon, so as to allow the upper ends of the succeeding panes of glass to pass under and lie upon the adjacent saddle, as clearly shown in Fig. 1. This arrangement permits said angle-plate to be adjusted in accordance with the various thicknesses of glass, insuring a tight and perfect lap and obviating the formation of a series of graduations in the upper edge of the rafters to receive each consecutive series of panes of glass, as practiced heretofore.

E indicates a strip of rubber or suitable packing, that is placed upon the upper face of the saddle C, upon which rest the adjacent edges of the panes of glass D, as clearly shown in Fig. 2.

F indicates an additional strip of packing placed upon the upper face of the panes of glass D over the opening between their adjacent edges, and over which is placed the sections of oval metal capping-strips H, the edges of which bear upon the upper face of the packing-strip F, all of said parts being bound together by the bolts $c$, whereby the edges of the panes of glass may be clamped between the layers E F of packing, making a tight joint and securely retaining the glass in place.

The meeting ends of the capping-strips H lap. The upper end of each section lies under the lower end of the section above it and is provided with a slot $i$, through which passes the bolt $c'$, that secures said lapped ends, as shown at the left of Fig. 1, whereby provision is made for the contraction and expansion of said parts longitudinally. A piece of packing $v$ is inserted under the lower end of each capping-strip H to exclude water therefrom.

It will now be apparent that the construction as described above forms a glass roof of great strength, that offers but slight obstruction to the light, in which each pane of glass is securely held in place and in such manner as to afford a tight and perfect roof.

Having thus fully set forth my invention, what I claim as new, and desire to secure by Letters Patent, is—

1. In conjunction with the rafter, the angle-iron, said angle-iron having a pivotal connection with the rafter at one end and an adjustable connection at the opposite end, the panes mounted on the angle-irons, the oval-shaped capping on said panes, and bolts binding the oval-shaped capping and the panes to the rafter, substantially as set forth.

2. The metallic rafter, in conjunction with the angular saddle, said saddle being pivoted to the side of the rafter at its upper end, its lower end being adjustably mounted on the rafter, the packing on said saddle, the glass panes on said packing, the strip of packing over the adjacent edges of the panes of glass, the capping mounted on said strip of packing, and screws passing through the capping and saddle between the panes of glass, substantially as specified.

In testimony whereof I affix my signature in presence of two witnesses.

JAMES D. SCOVEL.

Witnesses:
  E. S. WHEELER,
  R. B. WHEELER.